(12) United States Patent
Patel et al.

(10) Patent No.: US 10,159,027 B2
(45) Date of Patent: Dec. 18, 2018

(54) MEDIA DEGRADATION RECOVERY DURING A COMMUNICATION SESSION

(71) Applicant: Avaya, Inc., Basking Ridge, NJ (US)

(72) Inventors: Anirudh Patel, Pune (IN); Manish Patil, Pune (IN); Parag Mulay, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/052,484

(22) Filed: Feb. 24, 2016

(65) Prior Publication Data

US 2017/0245191 A1 Aug. 24, 2017

(51) Int. Cl.
*H04W 4/00* (2018.01)
*H04W 36/30* (2009.01)
*H04L 12/26* (2006.01)
*H04L 12/24* (2006.01)
*H04W 36/12* (2009.01)
*H04W 36/00* (2009.01)

(52) U.S. Cl.
CPC ......... *H04W 36/30* (2013.01); *H04L 41/5019* (2013.01); *H04L 41/5087* (2013.01); *H04L 43/16* (2013.01); *H04W 36/12* (2013.01)

(58) Field of Classification Search
CPC ......... H04W 36/0005; H04W 36/0011; H04W 36/0027; H04W 36/0044; H04W 36/005; H04W 36/0055; H04W 36/28; H04W 36/30; H04W 88/16; H04L 65/1023
USPC ........................................................ 455/436
See application file for complete search history.

(56) References Cited

U.S. PATENT DOCUMENTS

| | | | | |
|---|---|---|---|---|
| 2015/0017976 | A1* | 1/2015 | Liu | H04W 36/0033 455/423 |
| 2016/0056927 | A1* | 2/2016 | Liu | H04W 28/04 370/216 |

* cited by examiner

*Primary Examiner* — Huy C Ho (57) ABSTRACT

Embodiments disclosed herein provide systems, methods, and computer readable media for recovering from media degradation during a communication session. In a particular embodiment, a method provides, during a communication session between a first user system operated by a first user and a second user system operated by a second user, receiving a first indication from the first user system indicating a degraded condition of media received by the first user system from the second user system. Responsive to receiving the indication, the method provides attempting to establish a connection with a third user system associated with the second user when the degraded condition comprises inactivity of the media being received by the first user system from the second user system. Upon establishing the connection with the third user system, the method provides connecting the third user system to the first user system to continue the communication session.

18 Claims, 5 Drawing Sheets

MEDIA DEGRADATION RECOVERY DURING A COMMUNICATION SESSION

TECHNICAL FIELD

Aspects of the disclosure are related to improving user experience during a communication session and, in particular, to mitigating the effects of media degradation during the communication session.

TECHNICAL BACKGROUND

Communications between two end user systems can sometimes become degraded, which may adversely affect the experience of the users on the communication. In some situations, the communications may even become completely disconnected. Traditionally, a user may disconnect the communication and then attempt to reestablish the communication in hopes that the issues are resolved when the communication is reestablished. While that solution may work in some cases, reestablishing the communication between the same two user systems, and possibly through the same intervening systems (e.g. gateways), may result in the the reestablished communication suffering from the same issues as the prior communication. In fact, one of the user systems itself may have failed, which would prevent the other user system from contacting that user system when attempting to reestablish the communication.

OVERVIEW

Embodiments disclosed herein provide systems, methods, and computer readable media for recovering from media degradation during a communication session. In a particular embodiment, a method provides, during a communication session between a first user system operated by a first user and a second user system operated by a second user, receiving a first indication from the first user system indicating a degraded condition of media received by the first user system from the second user system degraded. Responsive to receiving the indication, the method provides attempting to establish a connection with a third user system associated with the second user when the degraded condition comprises inactivity of the media being received by the first user system from the second user system. Upon establishing the connection with the third user system, the method provides connecting the third user system to the first user system to continue the communication session.

In some embodiments, attempting to establish the connection with the third user system comprises identifying a plurality of user systems associated with the second user and attempting to establish a connection with each of the plurality of user systems in sequence. In these embodiments, the third user system comprises a first one of the plurality of user systems to which a connection can be established.

In some embodiments, the sequence is determined based on a preference for each of the plurality of user systems.

In some embodiments, the plurality of user systems comprises a mobile phone, a forwarded device, a covered device, and a voicemail system. In these embodiments, the sequence comprises the mobile phone first, the forwarded device second, the covered device third, and the voicemail system fourth.

In some embodiments, the method further comprises transferring a second indication to the first user system indicating that an attempt is being made to re-establish the communication session.

In some embodiments, the method further provides attempting to contact the first user system for reconnection before attempting to establish a connection with the third user system.

In some embodiments, the media passes through a first media gateway between the first user system and the second user system, and the method further provides, responsive to receiving the indication, reconfiguring the communication session to pass through a second media gateway when the degraded condition comprises the media having a lower than a threshold quality when received by the first user system from the second user system.

In some embodiments, the first indication is transferred by the first user system at the instruction of the first user.

In some embodiments, the method provides performing diagnostics on the first media gateway to determine what caused the degraded condition and attempting to rectify what caused the degraded condition before reconfiguring the communication session.

In another embodiment, a method provides, during a communication session passing through a first media gateway between a first user system operated by a first user and a second user system operated by a second user, receiving a first indication from the first user system indicating a first degraded condition of media received by the first user system from the second user system. The method then provides, responsive to receiving the indication, reconfiguring the communication session to pass through a second media gateway when the degraded condition comprises the media having a lower than a threshold quality when received by the first user system from the second user system.

In some embodiments, the first indication is transferred by the first user system at the instruction of the first user.

In some embodiments, the method provides performing diagnostics on the first media gateway to determine what caused the degraded condition and attempting to rectify what caused the degraded condition before reconfiguring the communication session.

In some embodiments, the method provides, responsive to receiving the indication, attempting to establish a connection with a third user system associated with the second user when the degraded condition comprises inactivity of the media being received by the first user system from the second user system. Upon establishing the connection with the third user system, the method provides connecting the third user system to the first user system to continue the communication session.

In some embodiments, attempting to establish the connection with the third user system comprises identifying a plurality of user systems associated with the second user and attempting to establish a connection with each of the plurality of user systems in sequence. In these embodiments, the third user system comprises a first one of the plurality of user systems to which a connection can be established.

In some embodiments, the sequence is determined based on a preference for each of the plurality of user systems.

In some embodiments, the plurality of user systems comprises a mobile phone, a forwarded device, a covered device, and a voicemail system, and the sequence comprises the mobile phone first, the forwarded device second, the covered device third, and the voicemail system fourth.

In some embodiments, the method provides transferring a second indication to the first user system indicating that an attempt is being made to re-establish the communication session.

In some embodiments, the method provides attempting to contact the first user system for reconnection before attempting to establish a connection with the third user system.

In yet another embodiment, a communication control system is provided having one or more computer readable storage media and a processing system operatively coupled with the one or more computer readable storage media. Program instructions stored on the one or more computer readable storage media, when read and executed by the processing system, direct the processing system to, during a communication session passing through a first media gateway between a first user system operated by a first user and a second user system operated by a second user, receive a first indication from the first user system indicating a first degraded condition of media received by the first user system from the second user system. Responsive to receiving the indication the program instructions direct the processing system to reconfigure the communication session to pass through a second media gateway when the degraded condition comprises the media having a lower than a threshold quality when received by the first user system from the second user system. Also, the program instructions direct the processing system to attempt to establish a connection with a third user system associated with the second user when the degraded condition comprises inactivity of the media being received by the first user system from the second user system and, upon establishing the connection with the third user system, connect the third user system to the first user system to continue the communication session.

In some embodiments, the program instructions that direct the processing system to attempt to establish the connection with the third user system comprise program instructions that direct the processing system to identify a plurality of user systems associated with the second user and attempt to establish a connection with each of the plurality of user systems in sequence based on a preference for each of the plurality of user systems. In these embodiments, the third user system comprises a first one of the plurality of user systems to which a connection can be established.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
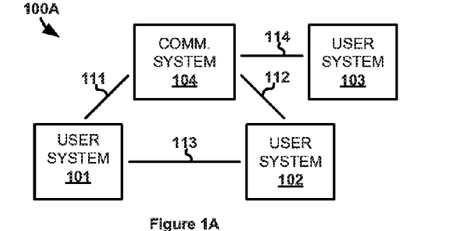
FIG. 1A illustrates a first communication environment for recovering from media degradation during a communication session.

FIG. 1A illustrates communication environment 100A for recovering from media degradation during a communication session. Communication environment 100A includes user system 101, user system 102, user system 103, and communication control system 104. User system 101 and communication control system 104 communicate over communication link 111. User system 102 and communication control system 104 communicate over communication link 112. User system 101 and user system 102 communicate over communication link 113. User system 103 and communication control system 104 communicate over communication link 114. In some embodiments described herein an additional communication link between user system 101 and user system 103 may also be created so as user system 101 and user system 103 can exchange communications without going through communication control system 104.

Figure 1B:
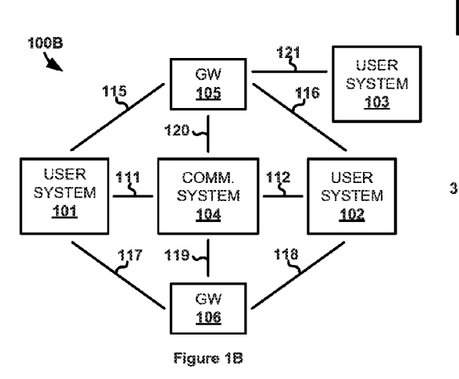
FIG. 1B illustrates a second communication environment for recovering from media degradation during a communication session.

FIG. 1B illustrates communication environment 100B for recovering from media degradation during a communication session. Communication environment 100B also includes user system 101, user system 102, user system 103, and communication control system 104. Communication environment 100B further includes media gateway 105 and media gateway 106. Elements 101-106 communicate over communication links 111-112 and 115-121 as shown.

In operation, communication control system 104 facilitates communication sessions between user system 101 and user system 102. Typically, the facilitation of communication sessions involves the exchange of control messages between user system 101, user system 102, and any other involved system to setup, maintain, and takedown a communication session. Communication environment 100B includes media gateway 105 and media gateway 106 through which media for communications pass, whereas user system 101 and user system 102 in communication environment 100A do not exchange media through a media gateway. In some cases, though not consequential for the purposes of this disclosure, media for a communication session (e.g. audio, video, graphics, etc.) may also pass through communication control system 104. It should be understood that communication control system 104 may facilitate communication sessions between more than just those user systems shown in communication environment 100A and communication environment 100B.

Figure 2:
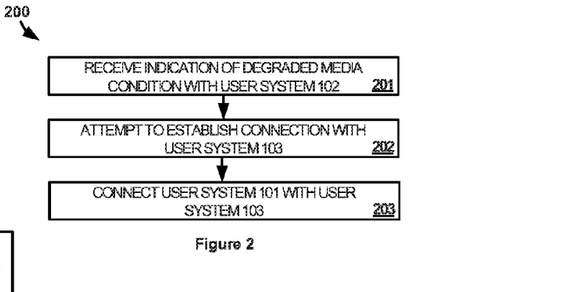
FIG. 2 illustrates a method of operating either the first or the second communication environment to recover from media degradation during a communication session.

FIG. 2 illustrates method 200 of operating either communication environment 100A or communication environment 100B to recover from media degradation during a communication session. Method 200 occurs after a communication session between user system 101 and user system 102 has already been established and media is being exchanged between user system 101 and user system 102 for that communication session on behalf of users of user system 101 and user system 102. As noted above, the media in communication environment 100B passes through one of media gateway 105 and media gateway 106 while the media in communication environment 100A does not. The media may include audio (e.g. voice), video, graphical, or any other type of media that can be exchanged over a communication network.

During the communication session, method 200 provides communication control system 104 receiving an indication from user system 101 indicating a degraded condition of media received by user system 101 from user system 102 (201). In this embodiment, the degraded condition comprises a complete or substantially complete inactivity of media being received from user system 102. The inactivity of media may be determined based on user system 101 detecting the absence of packets being received from user system 102 by user system 101. For example, user system 101 may be configured with a threshold amount of time within which a media packet should be received from user system 102. If no additional media packets are received in that threshold amount of time since a most recent media packet was received, then user system 101 determines that a loss of media communication with user system 102 has occurred for the communication session. User system 101 then sends communication control system 104 an indication of that loss in accordance with step 201.

Responsive to receiving the indication, method 200 provides communication control system 104 attempting to establish a connection with user system 103 (step 202). User system 103 is associated with a user of user system 102. For instance, user system 103 may be a mobile phone, a forwarded device, a covered device, voicemail system, or any other type of system or device associated (e.g. owned by, operated by, or otherwise) with the user of user system 102. In some cases, user system 103 may be selected by communication control system 104 from multiple user systems associated with the user of user system 102. That selection may be based on a priority assigned to each of the multiple user systems. For example, communication control system 104 may attempt to connect with each of the multiple user systems in order of their priority, with higher priority systems first, until a connection is made. In some examples, communication control system 104 may transfer a message to user system 101 indicating that communication control system 104 is attempting to reestablish the communication session with another system associated with the user of user system 102. User system 101 may then present (e.g. audibly, visually, or otherwise) an indication of such to its user.

Upon establishing the connection with user system 103, method 200 provides communication control system 104 connecting user system 103 to user system 101 to continue the communication session (203). Once the connection is made to user system 103, the media for the communication session may be exchanged through communication control system 104 or the communication session may be configured by communication control system 104 such that the media between user system 101 and user system 103 does not pass through communication control system 104. Regardless of the path taken by the media, the users of user system 101 and user system 102 can continue their communication session by using user system 101 and user system 103.

Figure 3:
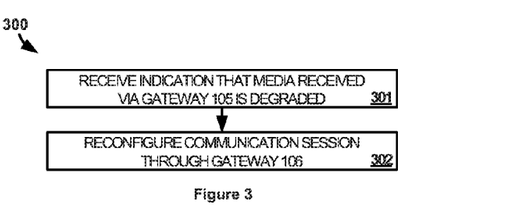
FIG. 3 illustrates a method of operating the second communication environment to recover from media degradation during a communication session.

FIG. 3 illustrates method 300 of operating communication environment 100B to recover from media degradation during a communication session. As was the case with method 200, method 300 occurs after a communication session between user system 101 and user system 102 has already been established and media is being exchanged between user system 101 and user system 102 for that communication session on behalf of users of user system 101 and user system 102. In this embodiment, the media between user system 101 and user system 102 for the communication session traverses media gateway 105. The media may include audio (e.g. voice), video, graphical, or any other type of media that can be exchanged over a communication network.

During the communication session, which is passing through media gateway 105 between user system 101 and user system 102, method 300 provides communication control system 104 receiving an indication from user system 101 indicating a degraded condition of the media received by user system 101 from user system 102 (step 301). In this example, the degraded condition comprises the media having a lower than a threshold quality when received by user system 101 from user system 102. The threshold may be preset in user system 101 and user system 101 may automatically monitor the quality of the media received from user system 102 to determine whether that quality falls below the threshold. The threshold may define quality based percentages, ratios, or otherwise of errored packets, lost packets, delayed packets, or some other parameter that could affect the quality of media received by user system 101. In some cases, an indication that the quality has fallen below the threshold may be received from input of a user of user system 101 indicating that the user has noticed degradation in the media as it is presented by user system 101.

Responsive to communication control system 104 receiving the indication, method 300 provides communication control system 104 reconfiguring the communication session to pass through media gateway 106 (302). The reconfiguring may include notifying user system 101, user system 102, media gateway 105, and media gateway 106 that media gateway 106 will now be used to exchange the media between user system 101 and user system 102. The notification to each system and gateway may include providing network addresses so that user system 101, user system 102, and media gateway 106 all know where packets carrying the media should be sent. Once media gateway 106 is being used to pass the media for the communication session, any quality issues that were caused by media gateway 105 are now gone since media gateway 105 is no longer in the communication path for the media.

In some examples, communication control system 104 may perform diagnostics on media gateway 105 to try to determine what may have caused the media degradation. In some cases, the diagnostics may be performed after media gateway 106 has been configured to handle the media while, in other cases, the diagnostics may be performed prior to media gateway 106 being configured to handle the media. In the latter case, if communication control system 104 determines that media gateway 105 is working normally and is not causing the media degradation, then communication control system 104 may keep media gateway 105 configured to handle the media. Additionally, when diagnostics are performed prior to media gateway being configured to handle the media, communication control system 104 may first try to rectify any issue found during the diagnostics. If the issue is resolved, then media gateway 105 may continue to be used for the media and, if the issue remains, then communication control system 104 may configure media gateway 106 to handle the media.

It should be understood that, in the case of communication environment 100B, communication control system 104 may be capable of performing both method 200 and method 300. In other words, upon receiving the indication of media degradation, communication control system 104 will perform method 200 or method 300 depending on the type of degradation indicated by user system 101. Method 200 is performed if the degradation comprises a complete or substantially complete inactivity of media being received from user system 102. Alternatively, method 300 is performed if the degradation comprises the media having a lower than a threshold quality when received by user system 101 from user system 102. In some cases, one of methods 200 and 300 may be performed after the other method has already been performed.

Referring back to FIG. 1, communication control system 104 comprises a computer processor system and communication interface. Communication control system 104 may also include other components such as a router, server, data storage system, and power supply. Communication control system 104 may reside in a single device or may be distributed across multiple devices. While shown separately, communication control system 104 may be incorporated into one or more of user systems 102 and 103. Communication control system 104 may be an audio communication server, video communication server, application server, personal computer workstation, network gateway system, or some other computing system—including combinations thereof.

User systems user system 101-103 each comprise a computer processor system and a communication interface. User systems 101-103 may further include at least one microphone or may be operatively coupled to at least one microphone for capturing audio. User systems 101-103 may also include other components such as a router, server, data storage system, and power supply. User systems 101-103 may each reside in a single device or may be distributed across multiple devices. User systems 101-103 may be a telephone, computer, tablet, conference room system, e-book, mobile Internet appliance, network interface card, media player, game console, application server, proxy server, or some other communication apparatus—including combinations thereof.

Communication links 111-121 use metal, glass, air, space, or some other material as the transport media. Communication links 111-121 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-121 could be direct links or may include intermediate networks, systems, or devices.

Figure 4:
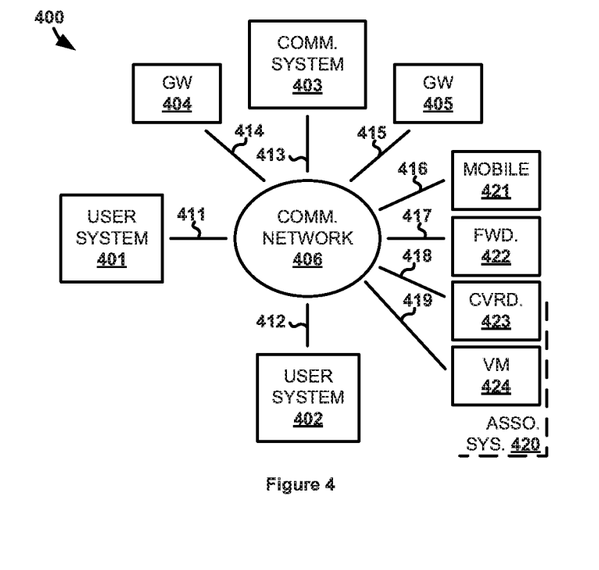
FIG. 4 illustrates another communication environment for recovering from media degradation during a communication session.

FIG. 4 illustrates communication environment 400 for recovering from media degradation during a communication session. Communication environment 400 includes user system 401, user system 402, communication control system 403, media gateway 404, media gateway 405, communication network 406, mobile phone 421, forwarded device 422, covered device 423, and voicemail system 424. Elements 401-405 and 421-424 communicate through communication network 406 over communication links 411-419, respectively.

Communication network 406 comprises network elements that provide communications services to connected systems and devices. Communication network 406 may comprise switches, wireless access nodes, Internet routers, network gateways, application servers, computer systems, communication links, or some other type of communication equipment—including combinations thereof. Communication network 406 may be a single network, such as a local area network, a wide area network, a public switched telephone network (PSTN), or the Internet, or may be a combination of multiple networks.

In this example, user system 401 and user system 402 comprise communication systems that exchange packet based media for communication sessions. User system 401 and user system 402 may comprise dedicated communication devices, such as IP telephones, may comprise computing devices that execute application software to perform packet communication functionality, or may comprise some other form of communication system—including combinations thereof. Mobile phone 421, forwarded device 422, covered device 423, and voicemail system 424 are collectively associated systems 420 that are associated with a user of user system 402. Each of associated systems 420 may communicate using packets to transfer media like user system 401 and user system 402 or may use other communication modes. For instance, mobile phone 421 may communicate over a traditional cellular voice channel or covered device 423 may be a circuit switched telephone that communicates over a PSTN. In some cases, it may be preferable for an associated system to use a different communication mode than user system 402 to increase the likelihood that communication control system 403 can connect with one of associated systems 420.

Figure 5:
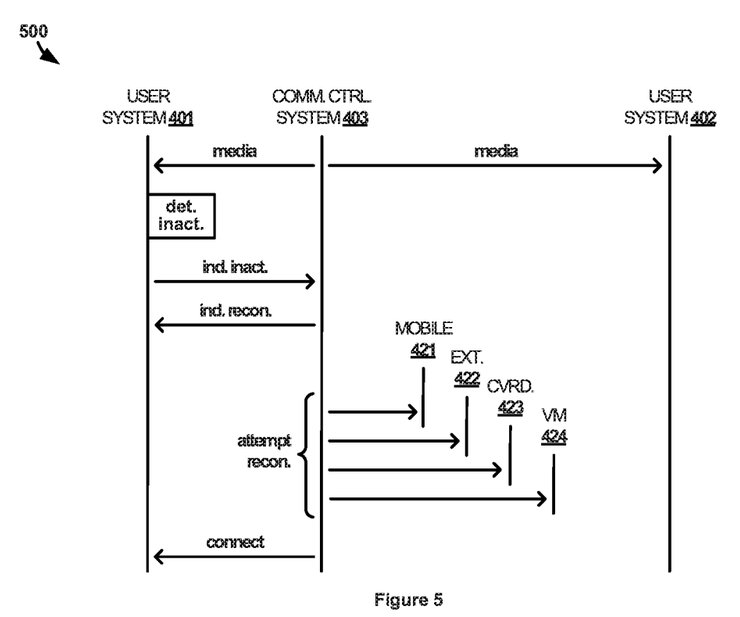
FIG. 5 illustrates an operational scenario of operating the other communication environment to recover from media degradation during a communication session.

FIG. 5 illustrates an operational scenario 500 of operating communication environment 400 to recover from media degradation during a communication session. In scenario 500, media is being exchanged in packets between user system 401 and user system 402. This media may or may not pass through communication control system 403. Likewise, the media may or may not pass through media gateway 404 or media gateway 405. The media may include audio (e.g. voice), video, graphical, or any other type of media that can be exchanged over a communication network.

User system 401 detects inactivity of the media being received by user system user system 401 from user system 402. In response to detecting the inactivity, user system 401 transfers a message to communication control system 403 indicating that user system 401 has detected the inactivity. Upon receiving the message, communication control system 403 transfers a message to user system 401 indicating that communication control system 403 is attempting to reconnect the communication session with the user(s) of user system 402 via other devices associated with user system 402. User system 401 may then present its user(s) with an indication that communication control system 403 is attempting to reconnect with the user of user system 402.

In this example, communication control system 403 attempts to reconnect the communication session by connecting with one of associated systems 420. Associated systems 420 may be defined to communication control system 403 by the user of user system 402 or by some other user, such as an administrator in charge of communication control system 403. Each of associated systems 420 may be defined based on contact information, such as phone number, network address, or otherwise. The priority of each of associated systems 420 may also be defined by a user or communication control system 403 may automatically determine the priority for each of associated systems 420 (e.g. communication control system 403 may set a priority based on device type).

The priority in this case indicates that mobile phone 421 should be tried first, followed by forwarded device 422, and covered device 423. Last in priority is voicemail system 424, which will continue the communication session by allowing the user of user system 401 to leave a voicemail for the user of user system 402. Communication control system 403 will stop attempting to connect with one of associated systems 420 and move onto the next priority system when either no response is received to communication control system 403's attempt to connect to the associated system (e.g. no one answers) or the user responding on the associated system indicates that the user of user system 402 is not available through that associated system. In an example of the latter situation, communication control system 403 may query the responding user either audibly or visually about whether the user of user system 402 is available and the responding user can indicate their response either vocally (e.g. via voice recognition) or using input on the associated system itself (e.g. pressing a button on the device).

Upon determining that the user of user system 402 is available at one of the associated systems, communication control system 403 connects the associated system with user system 401 to continue the communication session. For example, if the user of user system 402 is not available at mobile device 421 but then is available at forwarded device 422, then communication control system 403 connects user system 401 to forwarded device 422. If forwarded system 422 was not available, then communication control system 403 would have tried covered device 423 and then voicemail system 424. In some cases, if voicemail system 424 is down or otherwise unavailable, then communication control system 403 may transfer a message to user system 401 notifying user system 401 that communication control system 403 was unable to connect with one of associated systems 420.

Figure 6:
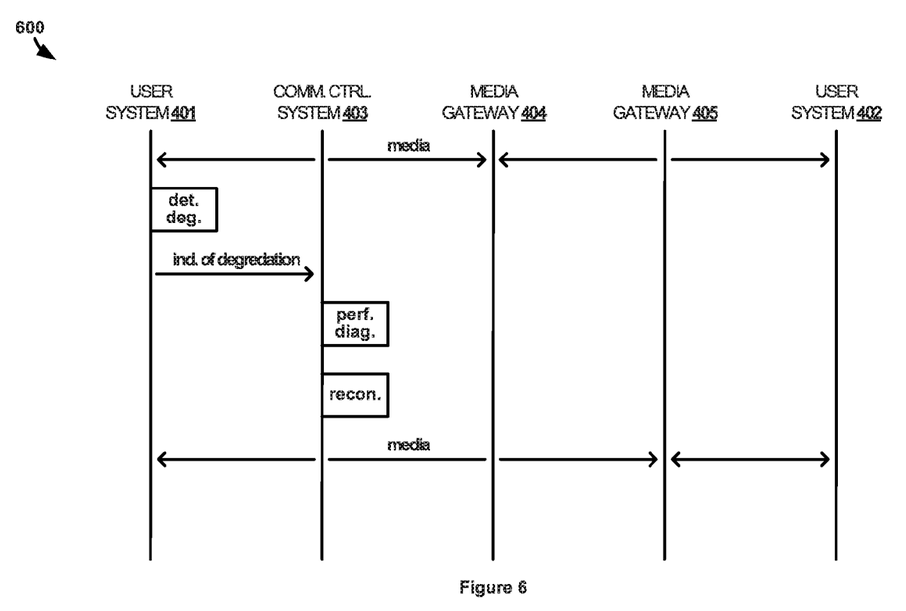
FIG. 6 illustrates an operational scenario of operating the other communication environment to recover from media degradation during a communication session.

FIG. 6 illustrates operational scenario 600 of operating communication environment 400 to recover from media degradation during a communication session. In scenario 600, media is being exchanged for a communication session between user system 401 and user system 402. During the exchange of media, user system 401 detects that the media is degraded. The detection may be based on input from a user of user system 401 or automatically based on a threshold(s) preset in user system 401, which may be updated by communication control system 403.

In response to receiving the message from user system 401, communication control system 403 performs diagnostics on media gateway 404, which is currently handling the media for the communication session, to determine whether there are any problems with media gateway 404. If communication control system 403 determines that media gateway 404 is not having any problems, then communication control system 403 may allow the media to continue passing though media gateway 404. However, if the diagnostics determine that media gateway 404 is having problems and is unable to rectify the problems satisfactorily, then communication control system 403 reconfigures the communication session so that media gateway 405 handles the media between user system 401 and user system 402. The media is therefore no longer affected by any of the problems caused by media gateway 404.

Figure 7:
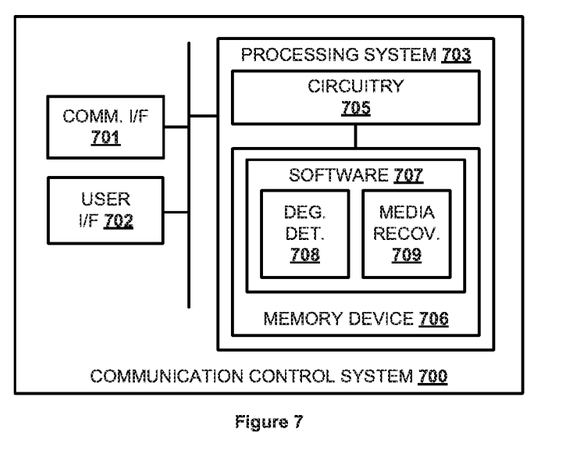
FIG. 7 illustrates a communication control system for recovering from media degradation during a communication session.

FIG. 7 illustrates communication control system 700. Communication control system 700 is an example of communication control systems 104 and 403, although systems 104 and 403 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes degradation detection module 708 and media recovery module 709. Operating software 707 may further include an operating system, utilities, drivers, network interfaces, applications, or some other type of software. When executed by circuitry 705, operating software 707 directs processing system 703 to operate communication control system 700 as described herein.

In particular, criteria module 708 directs processing system 703 to during a communication session passing through a first media gateway between a first user system operated by a first user and a second user system operated by a second user, receive a first indication from the first user system indicating a first degraded condition of media received by the first user system from the second user system. Responsive to receiving the indication, media recovery module 709 directs processing system 703 to reconfigure the communication session to pass through a second media gateway when the degraded condition comprises the media having a lower than a threshold quality when received by the first user system from the second user system. When the degraded condition comprises inactivity of the media being received by the first user system from the second user system, media recovery module 709 directs processing system 703 to attempt to establish a connection with a third user system associated with the second user and, upon establishing the connection with the third user system, connect the third user system to the first user system to continue the communication session.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of recovering from media degradation during a communication session, the method comprising:
in a communication control system that facilitates a communication session between a first user system operated by a first user and a second user system operated by a second user, wherein media for the communication session is exchanged on behalf of the first user and the second user:
during the communication session, receiving a first indication from the first user system indicating a degraded condition comprising inactivity of the media received by the first user system from the second user system; and
responsive to receiving the first indication,
attempting to establish a connection with a third user system associated with the second user and, upon establishing the connection with the third user system, connecting the third user system to the first user system to continue the communication session.

2. The method of claim 1, wherein attempting to establish the connection with the third user system comprises:
identifying a plurality of user systems associated with the second user; and
attempting to establish a connection with each of the plurality of user systems in sequence, wherein the third user system comprises a first one of the plurality of user systems to which a connection can be established.

3. The method of claim 2, wherein the sequence is determined based on a preference for each of the plurality of user systems.

4. The method of claim 3, wherein the plurality of user systems comprises a mobile phone, a forwarded device, a covered device, and a voicemail system, and wherein the sequence comprises the mobile phone first, the forwarded device second, the covered device third, and the voicemail system fourth.

5. The method of claim 1, further comprising:
transferring a second indication to the first user system indicating that an attempt is being made to re-establish the communication session.

6. The method of claim 1, further comprising:
attempting to contact the first user system for reconnection before attempting to establish a connection with the third user system.

7. A non-transitory computer readable medium having program instructions stored thereon for recovering from media degradation during a communication session, the program instructions, when read and executed by a processing system of a communication control system, direct the processing system to:
during a communication session between a first user system operated by a first user and a second user system operated by a second user, wherein media for the communication session is exchanged on behalf of the first user and the second user:
receive a first indication from the first user system indicating a first degraded condition comprising inactivity of the media received by the first user system from the second user system; and
responsive to receiving the first indication,
attempt to establish a connection with a third user system associated with the second user and, upon establishing the connection with the third user system, connect the third user system to the first user system to continue the communication session.

8. The computer readable medium of claim 7, wherein to attempt to establish the connection with the third user system, the program instructions direct the processing system to:
identify a plurality of user systems associated with the second user; and
attempt to establish a connection with each of the plurality of user systems in sequence, wherein the third user system comprises a first one of the plurality of user systems to which a connection can be established.

9. The computer readable medium of claim 8, wherein the sequence is determined based on a preference for each of the plurality of user systems.

10. The computer readable medium of claim 9, wherein the plurality of user systems comprises a mobile phone, a forwarded device, a covered device, and a voicemail system, and wherein the sequence comprises the mobile phone first, the forwarded device second, the covered device third, and the voicemail system fourth.

11. The computer readable medium of claim 7, wherein the program instructions further direct the processing system to:
transfer a second indication to the first user system indicating that an attempt is being made to re-establish the communication session.

12. The computer readable medium of claim 7, wherein the program instructions further direct the processing system to:
attempt to contact the first user system for reconnection before attempting to establish a connection with the third user system.

13. A communication control system to recover from media degradation during a communication session, the communication control system comprising:
one or more non-transitory computer readable storage media;
a processing system operatively coupled with the one or more computer readable storage media; and
program instructions stored on the one or more computer readable storage media that, when read and executed by the processing system, direct the processing system to:
during a communication session between a first user system operated by a first user and a second user system operated by a second user, wherein media for the communication session is exchanged on behalf of the first user and the second user, receive a first indication from the first user system indicating a first degraded condition comprising inactivity of media received by the first user system from the second user system;
responsive to receiving the indication,
attempt to establish a connection with a third user system associated with the second user and, upon establishing the connection with the third user system, connect the third user system to the first user system to continue the communication session.

14. The communication control system of claim 13, wherein the program instructions that direct the processing system to attempt to establish the connection with the third user system comprise program instructions that direct the processing system to:

identify a plurality of user systems associated with the second user; and attempt to establish a connection with each of the plurality of user systems in sequence based on a preference for each of the plurality of user systems, wherein the third user system comprises a first one of the plurality of user systems to which a connection can be established.

15. The communication control system of claim 14, wherein the sequence is determined based on a preference for each of the plurality of user systems.

16. The communication control system of claim 15, wherein the plurality of user systems comprises a mobile phone, a forwarded device, a covered device, and a voicemail system, and wherein the sequence comprises the mobile phone first, the forwarded device second, the covered device third, and the voicemail system fourth.

17. The communication control system of claim 13, wherein the program instructions further direct the processing system to:

transfer a second indication to the first user system indicating that an attempt is being made to re-establish the communication session.

18. The communication control system of claim 13, wherein the program instructions further direct the processing system to:

attempt to contact the first user system for reconnection before attempting to establish a connection with the third user system.

\* \* \* \* \*